Aug. 11, 1964   J. F. FRENCH   3,144,122
APPARATUS FOR CONTROLLING THE MOVEMENT OF CONTAINERS
Original Filed Nov. 21, 1958
5 Sheets-Sheet 1
FIG_1
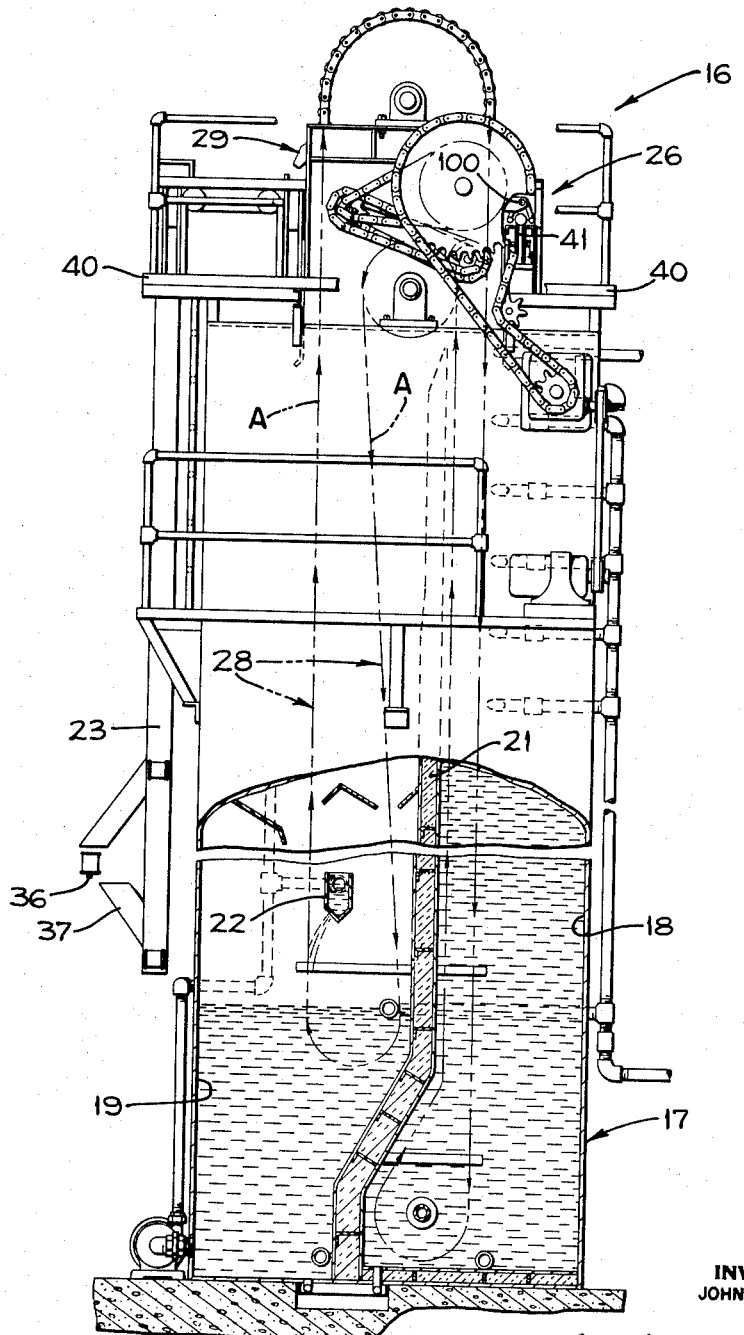
INVENTOR
JOHN F. FRENCH
BY
ATTORNEY

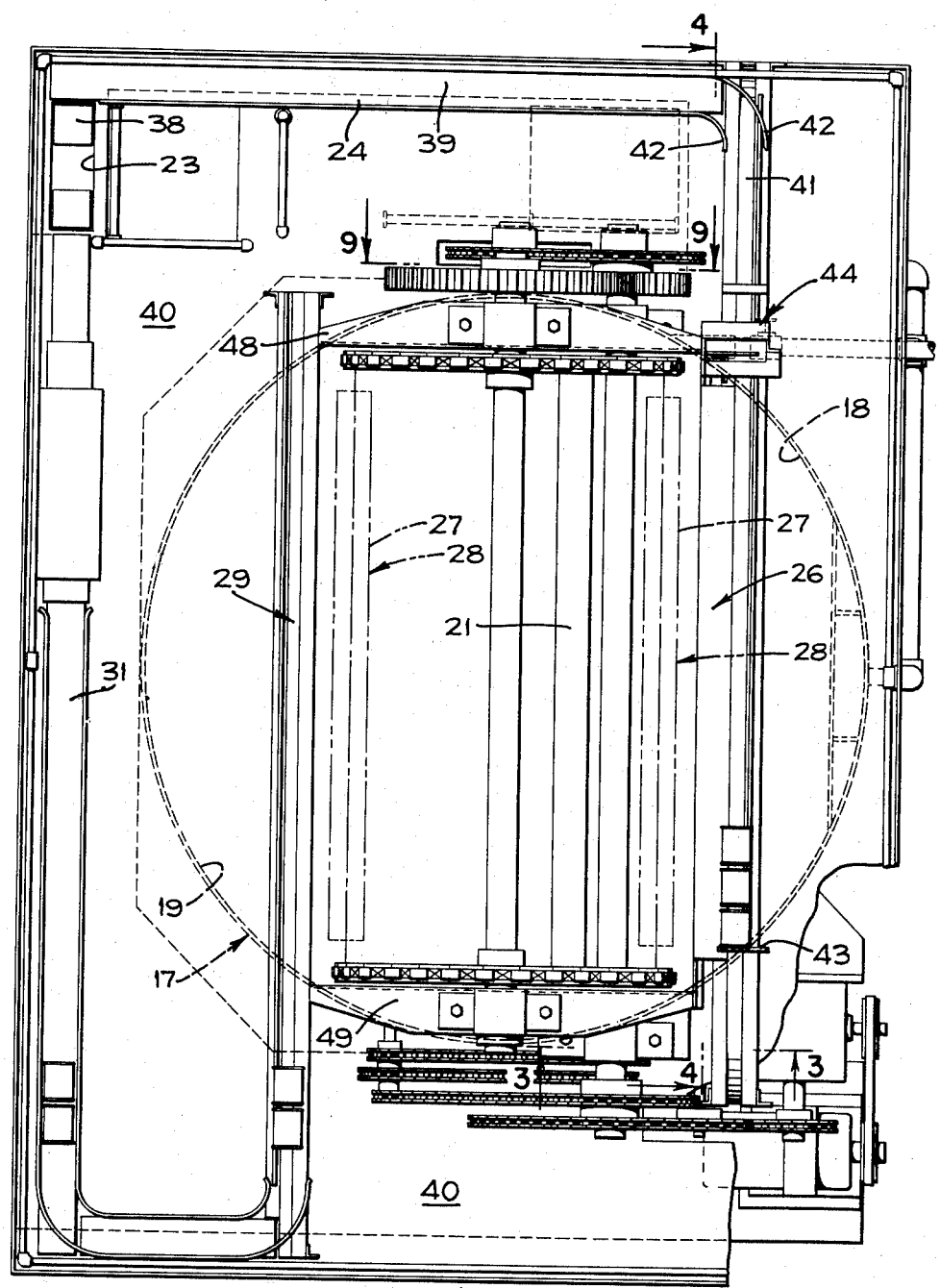
FIG_2

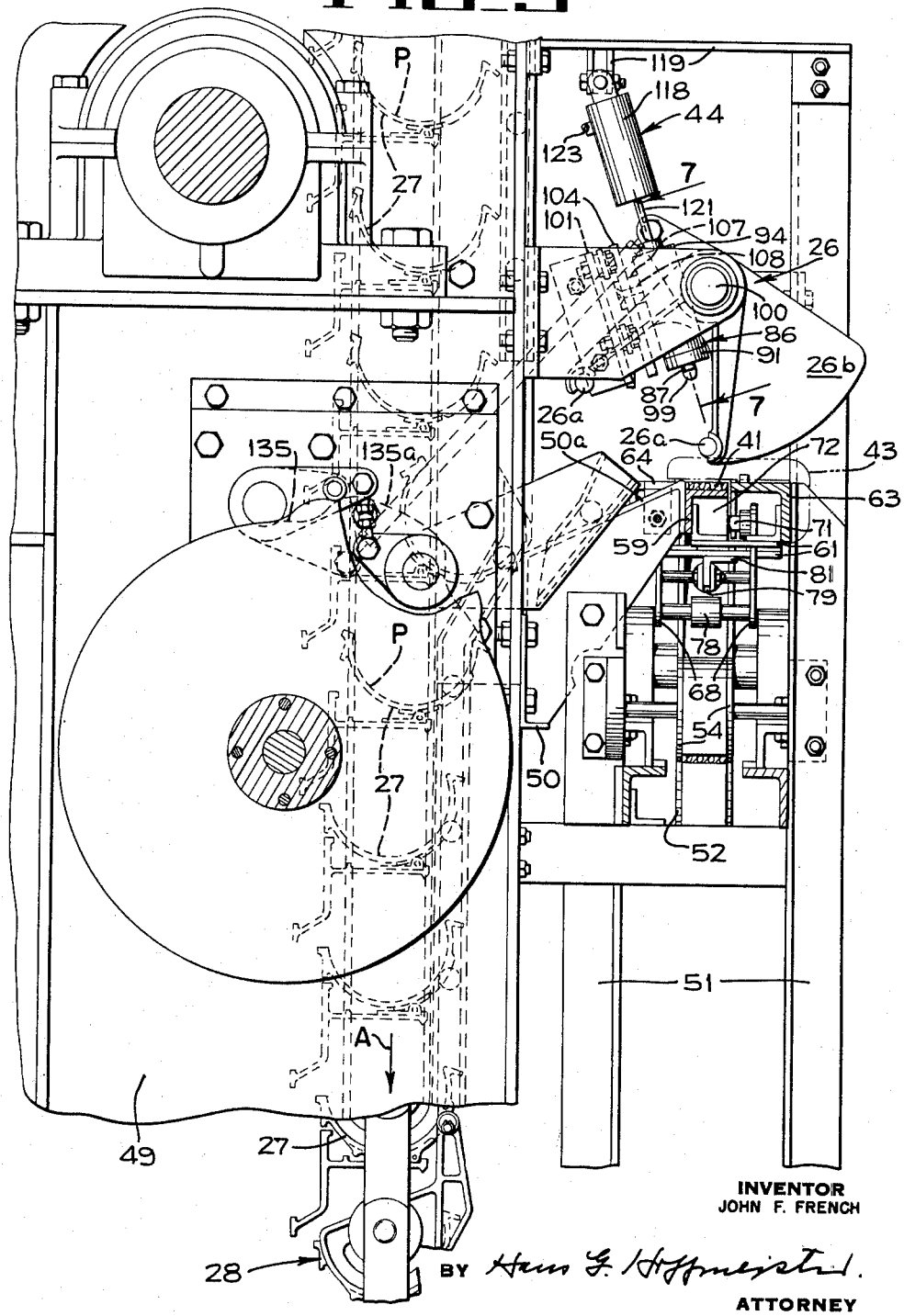

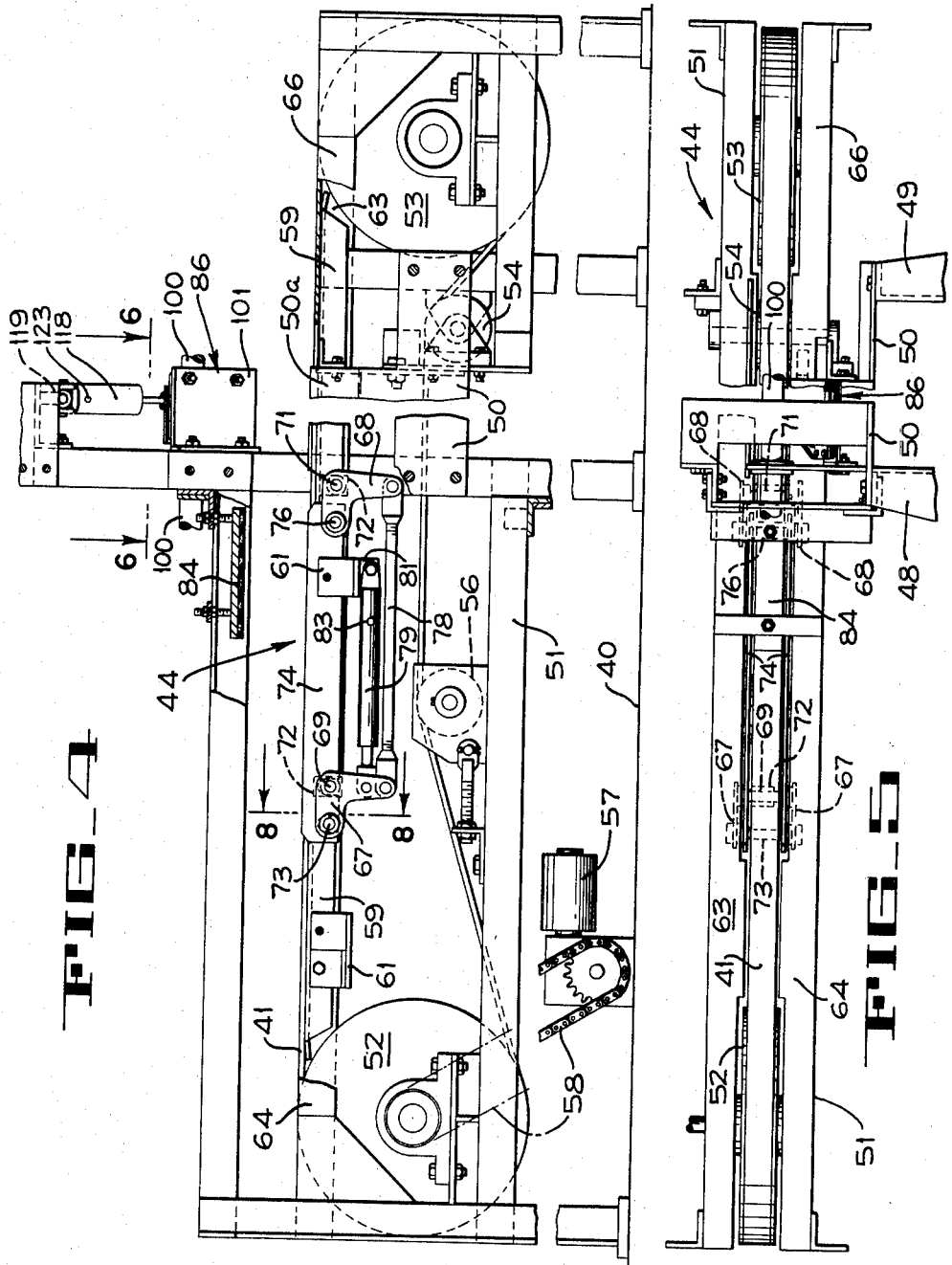

Aug. 11, 1964  J. F. FRENCH  3,144,122
APPARATUS FOR CONTROLLING THE MOVEMENT OF CONTAINERS
Original Filed Nov. 21, 1958  5 Sheets-Sheet 5
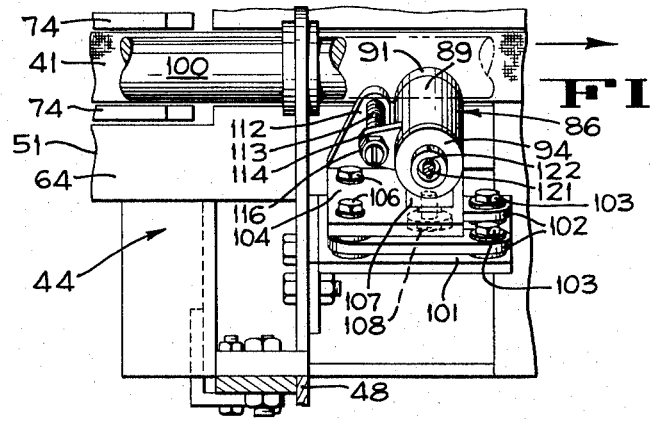
FIG_6
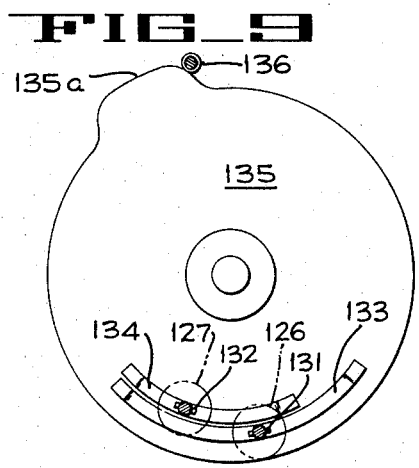
FIG_9
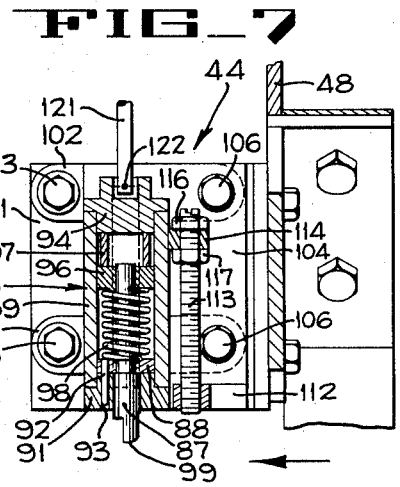
FIG_7
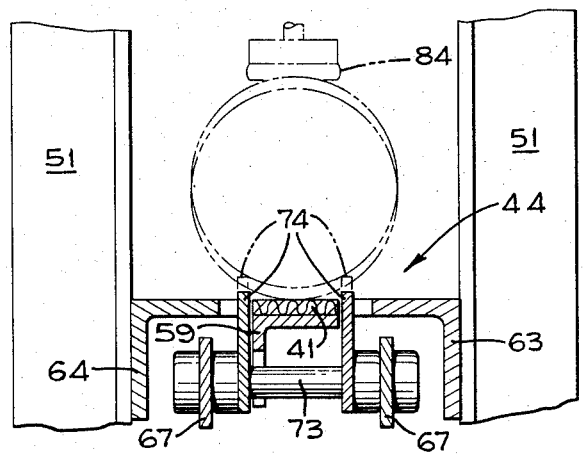
FIG_8
INVENTOR
JOHN F. FRENCH
BY Hans G. Hoffmeister
ATTORNEY

United States Patent Office 3,144,122
Patented Aug. 11, 1964

3,144,122
APPARATUS FOR CONTROLLING THE
MOVEMENT OF CONTAINERS
John F. French, San Jose, Calif., assignor to FMC Corporation, San Jose, Calif., a corporation of Delaware
Original application Nov. 21, 1958, Ser. No. 775,435, now Patent No. 3,067,850, dated Dec. 11, 1962. Divided and this application Feb. 9, 1962, Ser. No. 172,316
9 Claims. (Cl. 198—34)

This application is a division of my copending application, Serial No. 775,435, filed November 21, 1958, now U.S. Patent No. 3,067,850, issued December 11, 1962.

The present invention pertains to apparatus for controlling the movement of containers, and more particularly relates to a mechanism for arresting the movement of containers as they move through a continuous cooking and cooling unit in timed relation with the operation of other mechanisms of the unit.

One object of the present invention is to provide an improved container arresting apparatus for a feed conveyor of a continuous cooker and cooler.

Another object is to provide a container arresting apparatus for a feed conveyor having a primary arresting unit arranged to frictionally arrest the movement of containers on the conveyor and having secondary arresting unit for positively arresting containers which vibrate free of the primary arresting unit.

Another object is to provide a secondary arresting unit arranged to be actuated subsequently to a primary arresting unit and having yieldable means arranged to yield in the event the secondary arresting unit is actuated when a container is positioned thereunder.

These and other objects and advantages of the present invention will become apparent from the following description and the accompanying drawings, in which:

FIG. 1 is an elevation of a continuous cooker and cooler with which the arresting apparatus of the present invention is associated, certain parts being shown diagrammatically and other parts being cut away and shown in section.

FIG. 2 is an enlarged plan of the cooker and cooler of FIG. 1, certain parts of the feed unit and discharge unit being omitted and other parts being cut away.

FIG. 3 is an enlarged vertical section taken along lines 3—3 of FIG. 2 showing a portion of the arresting apparatus of the present invention.

FIG. 4 is a vertical section taken along lines 4—4 of FIG. 2 showing the container arresting apparatus, certain parts being broken away.

FIG. 5 is a plan of the arresting unit shown in FIG. 4, certain parts being broken away.

FIG. 6 is an enlarged horizontal section taken along line 6—6 of FIG. 4.

FIG. 7 is an enlarged section taken along lines 7—7 of FIG. 3.

FIG. 8 is an enlarged vertical section taken along lines 8—8 of FIG. 4 showing the can arresting unit in operative and inoperative positions.

FIG. 9 is a section in a vertical plane indicated by lines 9—9 of FIG. 2, showing switch actuating cams and with certain parts being shown in phantom.

The continuous cooker and cooler 16 (FIGS. 1 and 2) comprises a cylindrical, vertically extending tank 17 divided into a cooking chamber 18 and a cooling chamber 19 by a partition 21. The cooking chamber 18 is filled with hot water for cooking the contents of sealed containers, which hereinafter will be referred to as cans, and the cooling chamber 19 is provided with a plurality of water spray troughs 22 for spraying cold water on the cans to cool the cans and the contents therein to an acceptable discharge temperature.

Filled and sealed cans are raised by an elevator 23, shown diagrammatically at the left side of FIG. 1, to a position at a higher elevation than the tank 17 where the cans are received by a feed conveying system 24 (FIG. 2) and are moved into position above the tank 17 and alongside a pusher mechanism of a cooker feed unit 26. The feed unit 26 (FIG. 1) moves a line of several cans from the conveying system 24 into the pocket P (FIG. 3) of each of a plurality of elongated can carriers 27. The carriers 27 are connected together to define an endless conveyor 28 (FIG. 1) movable through the cooking chamber 18 and the cooling chamber 19 and arranged to be continually driven in the direction indicated by the arrows A in FIG. 1.

After a line of cans has been moved into the pocket P (FIG. 3) of each carrier 27 by the feed unit 26 (FIG. 1), the line of cans is moved down and then up through the hot water in the cooking chamber 18 and thereafter down and up through the sprayed water in the cooling chamber 19. Each line of cans is then moved into position to be discharged from its carrier pocket P by a discharge unit 29 (FIG. 2). The discharge cans are received on a discharge conveying system 31, which advances the cans to the downward moving run of the elevator 23 for discharge from the continuous cooker and cooler 16.

More specifically, the conveying structure for moving the cans to the cooker feed unit 26 (FIG. 1) is as follows. Filled and sealed cans are advanced by a conveyor 36 from a sealer (not shown). The conveyor 36 moves the cans onto a chute 37 that discharges the cans into pockets in the upwardly moving run 38 (FIG. 2) of the elevator 23. The cans are discharged from the elevator 23 onto the conveyor 24 which includes a continuously driven conveyor 39 disposed above and supported by a platform 40 secured to the top of the tank 17. The cans are guided from the conveyor 39 to a continuously driven conveyor 41, extending at right angles thereto, by guide rails 42. An abutment member 43 prevents the cans from being discharged off the end of the conveyor 41 and stops a line of cans disposed end-to-end in position to be moved laterally into the pocket P (FIG. 3) of each carrier 27 by the feed unit 26 (FIG. 1) as the carriers 27 move therepast. The can arresting apparatus 44 of the present invention is disposed on the inlet side of the feed unit 26 and cooperates with the conveyor 41 to eliminate the possibility of a can being only partially disposed in the feed unit 26 when the unit is actuated to move a line of cans into a carrier pocket. Actuation of the unit 26 at such a time would cause a can jam on the conveyor 41.

The can arresting apparatus 44 (FIGS. 3 to 8) of the present invention is disposed on the inlet side of the feed conveyor 41 to prevent cans from entering the feed unit 26 when the feed unit 26 is being actuated to push a line of cans into an open pocket.

The can arresting apparatus 44 is mounted on a subframe 51 which is supported on the upper platform 40 (FIG. 4) and is connected to conveyor support members 48 and 49 by an elongated bracket 50, which bracket 50 provides the inclined ramp 50a down which each line of cans is rolled into the open pocket of a carrier.

The endless belt feed conveyor 41 (FIG. 4) is trained around a grooved drive pulley 52, a grooved driven pulley 53, a snubbing pulley 54 and a take-up pulley 56. The pulleys 52, 53, 54 and 56 are suitably journalled on the frame 51 and the drive pulley 52 is driven by a gear motor 57 connected thereto by a chain drive 58. The upper run of the conveyor 41 is guided along an angle track 59 which is secured to the frame 51 by brackets 61. An angle member 63 of the frame 51 extends the full length of the conveyor 41 and is disposed adjacent one side edge of the conveyor 41 with its upper surface in planar alignment with the upper surface of the upper run of the conveyor 41. Likewise, two aligned angle members 64 and 66 have their upper surfaces in planar alignment with the upper surface of the conveyor 41. The angle members 64 and 66 are disposed adjacent the other side of the conveyor 41, and the elongated bracket 50 is disposed in a space between adjacent ends of the members 64 and 66.

Two pairs of bell cranks 67 and 68 (FIGS. 4 and 5) are secured to pins 69 and 71, respectively, and the pins 69 and 71 are journalled in blocks 72 secured to the angle track 59. A pivot pin 73 connects the two bellcranks 67 and pivotally supports one end of a pair of can lifting bars 74. The other ends of the lifting bars 74 are pivotally received on a pin 76 which is secured to the other pair of bellcranks 68. The angle track 59 is slotted to receive the pins 73 and 76 and to allow the pins to be moved upwardly upon pivotal movement of the bellcranks 67 and 68. Likewise, the lifting bars 74 are slotted below the pin 69 so that the bars may be raised. A link 78 (FIG. 4) is pivotally connected to both pairs of bellcranks 67 and 68 so that movement of one arm will be transmitted to the other. An air cylinder 79 is pivotally connected to and extends between a bracket 81 secured to one of the brackets 61 and the pair of crank arms 67. Air under pressure entering the cylinder 79 through a port 83 will cause the crank arms 67 and 68 to pivot clockwise (FIG. 4) thereby raising the can lifting bars 74, and cans disposed thereabove, to the phantom line position shown in FIGURE 8. The bars are returned to the position shown in FIGURE 4 by a spring (not shown) inside the cylinder 79 when the air is bled from the cylinder 79. When the bars 74 are in the raised position, the cans are lifted off the conveyor 41 and are pushed into locking engagement against a resilient pad 84 disposed above the bars 74 and bolted to the frame 51. The pad 84 can be adjusted vertically to adapt the machine for operation with cans of different size.

The pad 84 and lifting bars 74 cooperate to grip the foremost can in a series of cans to stop all cans which are upstream of said foremost can. However, if only the rearmost edge of a can should be gripped between the pad 84 and the lifting bars 74, the foremost edge of the can will continue to bear against the continuously moving conveyor 41 and may be dislodged from the pad 84 during the operating stroke of the feed unit 26 and moved transversely off the conveyor 41 while it is not in proper position to enter the particular pocket P (FIG. 3) being loaded. In order to arrest the movement of this can, an abutment pin assembly 86 (FIG. 3), which defines a secondary arresting means, is employed. In general this emergency can stopping mechanism comprises an abutment pin 87 resiliently supported in a cylinder 89. When a line of end-to-end cans are in the push-off station, the cylinder 89 is moved bodily downwardly to project the abutment pin 87 into the path of movement of succeeding cans advancing toward the push-off station.

The abutment pin 87 of the assembly 86 is rigidly secured to a collar 88 (FIG. 7) that is slidably received in the cylinder 89. A lower end cap 91 is in press fit engagement with the cylinder 89 and is apertured to slidably receive the lower end of the abutment pin 87 which projects therethrough. A pin 92 is secured to the collar 88 and is slidably received in a hole 93 in the end cap 91, and serves to prevent the abutment pin 87 from rotating in the cylinder 89. An upper end cap 94 is rigidly secured to the upper end of the cylinder 89. A collar 96, which is slidable in the cylinder 89 and on the abutment pin 87, is spaced from the upper end cap 94 by a spacer ring 97 and is held thereagainst by a spring 98. The spring 98 is disposed between the collar 96 and the collar 88 and will allow the collar 88 and the abutment pin 87 to move upwardly within the cylinder 89, if the assembly 86 should be moved downwardly when the pin 87 is directly over a can rather than between spaced cans, as is desired. One side of the lower end of the pin 87 is rounded, as at 99, so that if the pin engages a can between its end beads, the trailing bead which at this time is moving in the direction of the arrow in FIG. 7 will engage the rounded edge, cam the pin upwardly, and pass under the pin.

The abutment pin assembly 86 is mounted for vertical movement by means of two parallel bars 102 on an angle bracket 101 (FIGS. 4 and 6). The bracket 101 is secured to the support member 48 which also supports one end of a shaft 100. The parallel bars 102 are pivotally mounted to the bracket 101 by bolts 103 and to a cylinder supporting bracket 104 by bolts 106. The cylinder 89 has a support block 107 (FIG. 6) which is drilled to receive a cap screw 108 that extends through a vertical slot, not shown, in the cylinder supporting bracket 104 to permit vertical adjustment of the cylinder 89 relative to the bracket 104. An ear 112 welded on the bracket 104 receives a threaded stud 113 which extends through a hole in an ear 114 welded on the cylinder 89. Lock nuts 116 and 117 screwed on the stud 113 and disposed above and below the ear 114, respectively, provide means for vertically adjusting the cylinder 89 relative to the bracket 104. After the cylinder 89 has been properly adjusted, the nuts 116 and 117 and cap screw 108 are tightened to lock the cylinder 89 in adjusted position. Thus, on actuation of the cylinder 118, after adjustment by the stud 113, the pin assembly 86 moves in a vertical direction since each of the parallel bars 102 is pivotally connected at one end to the support bracket 101 by a bolt 103 and since each of the bars 102 is pivotally connected at the other end to the pin assembly support bracket 104 by a bolt 106.

The vertical movement of the cylinder 89 is controlled by an air cylinder 118 (FIG. 3) which is pivotally connected to a bracket 119 secured to the frame 51 and to the support member 48. The cylinder 118 has an actuating element 121 pivotally connected to the upper end cap 94 (FIG. 7) by a pivot pin 122. Air entering the cylinder 118 (FIG. 3) through a port 123 will move the abutment pin assembly 86 downwardly to a position where the abutment pin 87 lies in the path of movement of cans in the feed conveyor 41. In the event the abutment pin 87 is disposed directly above a can rather than between consecutive cans when the assembly is moved down, the upper surface of the can will slide under the pin, and cam the pin up to permit the trailing bead to move past the abutment pin. The spring 98 will then urge the pin 87 down into the path of movement of the succeeding cans. When air is bled from the cylinder 118, a spring (not shown) in the cylinder will raise the abutment pin assembly 86 and the pin 87 to an elevated position above the path of movement of the cans on the conveyor 41.

The actuation of the air cylinders 79 and 118 (FIG. 4) is timed with the movement of the feed unit 26, the feed conveyor 41 and the can carrier conveyor 28. This timed relation is such that the air cylinder 79 is actuated first to raise the bars 74 and to lock a can or cans supported thereon against the pad 84, thereby stopping the following cans. After sufficient time has been allowed for any can disposed between the pad 84 and the abutment pin 87 to move past the abutment pin 87 and into the feed push-off station, the cylinder 118 is actuated to move the abutment pin assembly 86 downwardly. After the assembly 86 has been moved down, the pin 87 will normally stop any cans vibrated loose from the pad 84. However, if a loose can gets under the pin 87, it will be permitted to move past the pin 87 and into the feed unit 26. The feed unit 26 is then actuated to move the line of cans into the open pocket to be filled. If the area between the pad 84 and the upstream end of the can pusher bars 26a of the feed unit 26 is completely filled, it is apparent that the can-stopping wing 26b (FIG. 3) which is on the upstream end of the feed unit 26, will prevent these cans from entering the feed unit 26 and fouling the same.

The structure for actuating the air cylinders 79 and 118 (FIG. 4) comprises air valves 126 and 127 (FIG. 9) which are connected to a source of high pressure air (not shown) and to the port 83 (FIG. 4) of the cylinder 79 and the port 123 of the cylinder 118, respectively, by air lines (not shown). The valves 126 and 127 are bolted to a bracket (not shown) which is, in turn, bolted to the support member 48. The valves 126 and 127 have cam followers 131 and 132, respectively, on their actuating elements. The cam followers 131 and 132 are arranged to be actuated by raised arcuate cams 133 and 134, respectively which are welded on the face of a cam 135. As shown in FIG. 9, upon rotation of the cam 135, the cam follower 131 of the valve 126 contacts the arcuate cam 133 to open the valve and direct air into the cylinder 79 (FIG. 4) thereby raising the bars 74 of the can arresting apparatus 44. The cam follower 132 (FIG. 9) of the valve 127 then contacts the arcuate cam 134 to direct air into the cylinder 118 (FIG. 3) thereby lowering the abutment pin assembly 86. Shortly thereafter, a cam follower 136 (FIG. 9) is actuated by the lobe 135a of the cam 135 to cause one of the can pusher bars 26a (FIG. 3) to push a line of cans off the conveyor 41. The cam followers 136, 131 and 132 then move out of contact with their respective camming surfaces simultaneously, thereby allowing air to bleed from the cylinders 79 and 118 permitting the bars 74 to lower and the abutment pins 87 to raise at the same time that the bars 26a of the push-off unit 26 return to a position to receive cans therebetween.

From the foregoing description it is apparent that the container arresting apparatus of the present invention includes a primary arresting unit which frictionally arrests the movement of containers on a feed conveyor, and a secondary arresting unit which positively arrest any containers which vibrate free from the primary unit. The can arresting apparatus provides an exceptionally effective means of preventing jamming of cans in a cooker.

While one embodiment of the present invention has been shown and described, it will be understood that various changes and modifications may be made without departing from the spirit of the invention or the scope of the appended claims.

Having thus described the present invention, what is claimed as new and desired to be protected by Letters Patent is:

1. In an apparatus for processing comestibles in containers, a frame, a container feed conveyor supported on said frame, a pair of rails extending longitudinally of said feed conveyor, one rail being disposed on each side of said feed conveyor and below the containers carried on said feed conveyor, crank arms pivotally connecting said rails to said frame, a resilient pad secured to said frame and disposed above said conveyor, and actuating means connected to said crank arms for periodically actuating said arms to raise said rails and the containers supported thereon to a position above the surface of said feed conveyor and against said pad to temporarily arrest the movement of the raised containers and all following containers on said feed conveyor.

2. In an apparatus for processing comestibles in sealed containers, an elongated continuously driven conveyor, feed means disposed adjacent said conveyor for pushing a row of containers laterally off said conveyor, means for periodically actuating said feed means, an abutment pin arranged to be moved between a position above the path of movement of containers carried on said conveyor and a position in the path of movement of the containers, said abutment pin being disposed upstream of said feed means, and means timed with said actuating means for moving said abutment pin into the path of movement of said containers to arrest the movement of those containers upstream of said feed means prior to the actuation of said feed means.

3. In an apparatus for processing comestibles in sealed containers, an elongated continuously driven conveyor, push-off means disposed adjacent said conveyor for pushing a row of containers laterally off said conveyor, means for periodically actuating said push-off means, a support cylinder pivotally mounted above said conveyor, an abutment pin slidably received in said cylinder and having a rounded container contacting end portion, resilient means disposed between said abutment pin and an inner wall of said cylinder and normally arranged to urge said rounded end portion to a position projecting below said cylinder, means for pivotally actuating said support cylinder to move said abutment pin from a position disposed above the path of movement of containers on said conveyor to a position in which said rounded end portion is disposed in the path of movement of said containers, and control means for actuating said cylinder actuating means to lower said pin prior to the actuation of said push-off actuating means, said pin being arranged to move upwardly against the urging of said resilient means in the event said pin is moved downwardly directly against the surface of a container disposed therebelow.

4. In an apparatus for processing comestibles in containers, a frame, a continuously moving container feed conveyor supported on said frame, a pair of rails extending longitudinally of said feed conveyor, one rail being disposed on each side of said feed conveyor and below the containers carried on said feed conveyor, crank arms pivotally connecting said rails to said frame, a resilient pad secured to said frame and disposed above said conveyor and said rails, actuating means connected to said crank arms for periodically actuating said arms to raise said rails and to raise the containers which are disposed above said feed conveyor to a position above the surface of said feed conveyor and against said pad to temporarily arrest the movement of the raised containers and all following containers on said feed conveyor, an abutment pin, means pivotally mounting said abutment pin on said frame in a position downstream from said resilient pad and normally above the path of movement of said containers, and actuating means connected to said mounting means and arranged to temporarily lower said abutment pin into the path of movement of containers after said rails have been raised to arrest the movement of containers disposed between said pad and said pin.

5. In an apparatus for processing comestibles in containers, a frame, a container feed conveyor supported on said frame, a pair of rails extending longitudinally of said feed conveyor, one rail being disposed on each side of said feed conveyor and below the containers carried on said feed conveyor, crank arms pivotally connecting said rails to said frame, a resilient pad secured to said frame and disposed above said conveyor and said rails, actuating means connected to said crank arms for periodically actuating said arms to raise said rails and to raise the containers on the rails to a position against said pad to temporarily arrest the movement of the raised containers and all following containers on said feed conveyor, a bracket pivotally mounted on said frame and disposed downstream of said resilient pad and above the path of movement of said containers on said feed conveyor, a cylinder secured to said bracket, an abutment pin slidably received in said cylinder for movement toward and away from the path of movement of the containers, resilient means urging said pin toward said containers, and actuating means connected to said bracket and arranged to temporarily lower said bracket and said abutment pin into the path of movement of the containers after said rails have been raised to arrest the movement of containers disposed between said pad and said pin, said abutment pin being movable into said cylinder against the resistance of said resilient means in the event said pin is lowered directly onto the surface of a container.

6. A container arresting apparatus comprising a continuously driven conveyor for advancing a series of containers along a predetermined path, stationary gripping means disposed above the path of movement of the containers, container lifting means mounted for vertical movement on opposite sides of said conveyor, and actuating means connected to said lifting means for raising said lifting means into position to engage and lift certain containers thereabove into engagement with said gripping means to arrest the movement of said containers and the succeeding containers in the series.

7. A container arresting apparatus comprising a continuously driven conveyor for advancing a series of containers along a predetermined path, stationary resilient gripping means disposed above the path of movement of the containers, container lifting means mounted for vertical movement on opposite sides of said conveyor and movable between a position spaced below said articles on said conveyor and a position lifting certain articles from said conveyor into gripping engagement with said gripping means for arresting the movement of said certain articles and the articles therebehind, first actuating means connected to said lifting means for actuating the same, movable abutment means disposed above said conveyor at a point downstream of said resilient gripping means and movable between a position disposed above the path of movement of the article to a position within the path of movement of any container which avoids becoming arrested by said resilient gripping means, second actuating means for actuating said movable abutment means subsequent to the actuation of said first actuating means, and resilient means in said movable abutment means arranged to yield in the event said abutment means is lowered directly onto the surface of a container.

8. In an apparatus for conveying articles such as containers, an elongated continuously driven conveyor, push-off means disposed adjacent said conveyor for pushing a row of containers laterally off said conveyor, an abutment pin means pivotally mounted above said conveyor, means for pivotally actuating said pin means from a position disposed above the path of movement of said containers on said conveyor to a position in which said pin means is disposed in the path of movement of said containers, and control means for actuating said pin means for movement thereof into the path of movement of said containers to arrest the movement of said containers prior to the actuation of said push-off actuating means.

9. A container arresting apparatus comprising a continuously driven conveyor for advancing a series of containers along a predetermined path, stationary resilient gripping means disposed above the path of movement of the containers, container lifting means mounted for vertical movement on opposite sides of said conveyor and movable between a position spaced below said articles on said conveyor and a position lifting certain articles from said conveyor into gripping engagement with said gripping means for arresting the movement of said certain articles and the articles therebehind, first actuating means connected to said lifting means for actuating the same, movable abutment means disposed adjacent said conveyor at a point downstream of said resilient gripping means and movable between a position spaced from the path of movement of the article to a position within the path of movement of any container which avoids becoming arrested by said resilient gripping means, and second actuating means for actuating said movable abutment means.

References Cited in the file of this patent
UNITED STATES PATENTS

| | | |
|---|---|---|
| 1,028,766 | Montgomery | June 4, 1912 |
| 2,373,183 | Hawthorne | Apr. 10, 1945 |
| 2,769,523 | Ochwat | Nov. 6, 1956 |
| 2,878,919 | Jones | Mar. 24, 1959 |